United States Patent
Chandra et al.

(10) Patent No.: US 11,994,495 B2
(45) Date of Patent: May 28, 2024

(54) METHOD OF DETECTING CRACK PROPAGATION IN WALL OF A METALLURGICAL FURNACE AND A DETECTION UNIT

(71) Applicant: TATA STEEL LIMITED, Jharkhand (IN)

(72) Inventors: Sanjay Chandra, Jharkhand (IN); Balamurugan S., Jharkhand (IN); Shivanandan S. Indimath, Jharkhand (IN); Kokila M., Jharkhand (IN); Shunmuga Sundaram R., Jharkhand (IN); Uttam Singh, Jharkhand (IN); Padmapal, Jharkhand (IN); Subhashis Kundu, Jharkhand (IN); Mayank Tiwari, Jharkhand (IN)

(73) Assignee: TATA STEEL LIMITED, Jharkhand (IN)

( * ) Notice: Subject to any disclaimer, the term of this patent is extended or adjusted under 35 U.S.C. 154(b) by 26 days.

(21) Appl. No.: 17/043,081

(22) PCT Filed: Sep. 20, 2018

(86) PCT No.: PCT/IB2018/057241
§ 371 (c)(1),
(2) Date: Sep. 29, 2020

(87) PCT Pub. No.: WO2019/186256
PCT Pub. Date: Oct. 3, 2019

(65) Prior Publication Data
US 2021/0018469 A1    Jan. 21, 2021

(30) Foreign Application Priority Data
Mar. 30, 2018 (IN) .............................. 201831012060

(51) Int. Cl.
*G01N 29/12*      (2006.01)
*C21B 7/10*      (2006.01)
(Continued)

(52) U.S. Cl.
CPC ............. *G01N 29/12* (2013.01); *C21B 7/103* (2013.01); *F27D 21/0021* (2013.01);
(Continued)

(58) Field of Classification Search
CPC .. G01N 29/12; G01N 29/045; G01N 29/4409; G01N 29/46; G01N 2291/0234;
(Continued)

(56) References Cited

U.S. PATENT DOCUMENTS

| | | | | |
|---|---|---|---|---|
| 5,974,886 A | * | 11/1999 | Carroll ................. | G01B 17/025 |
| | | | | 73/598 |
| 2008/0092658 A1 | * | 4/2008 | Sadri ....................... | F27D 21/04 |
| | | | | 73/598 |
| 2016/0061783 A1 | * | 3/2016 | Viren ................. | G01N 29/0654 |
| | | | | 73/1.82 |

FOREIGN PATENT DOCUMENTS

| | | | | |
|---|---|---|---|---|
| CN | 86104884 A | * | 2/1987 | ......... G01N 29/0618 |
| EP | 0515734 A1 | * | 12/1992 | |

(Continued)

OTHER PUBLICATIONS

Translation CN-86104884-A (Year: 1987).*
(Continued)

*Primary Examiner* — Mischita L Henson
*Assistant Examiner* — Monica S Young
(74) *Attorney, Agent, or Firm* — Foley & Lardner LLP

(57) ABSTRACT

The present disclosure relates to a method of detecting crack propagation in a wall of a metallurgical furnace by a detection unit. The detection unit is configured to extract one or more dominant frequency parameters from the corre-
(Continued)

sponding reflected stress signal, and analysing, a phase from each dominant frequency parameters. The analysing of the phase comprises determines, one or more coefficients for each dominant frequency parameters. The detection unit then identifies, a dominant phase based on the corresponding one or more coefficients and selects a frequency relevant to a thickness parameter based on the dominant phase. The crack propagation in the wall of the metallurgical furnace is then detected based on the frequency relevant to the thickness parameter at each of the one or more locations. The present disclosure provides an accurate method for determining condition of refractory lining by elimination unwanted noise signals.

12 Claims, 8 Drawing Sheets

(51) Int. Cl.
| | | |
|---|---|---|
| | *F27B 1/28* | (2006.01) |
| | *F27D 21/00* | (2006.01) |
| | *F27D 21/04* | (2006.01) |
| | *G01N 29/04* | (2006.01) |
| | *G01N 29/44* | (2006.01) |
| | *G01N 29/46* | (2006.01) |

(52) U.S. Cl.
CPC ............ *F27D 21/04* (2013.01); *G01N 29/045* (2013.01); *G01N 29/4409* (2013.01); *G01N 29/46* (2013.01); *F27B 1/28* (2013.01); *G01N 2291/0234* (2013.01); *G01N 2291/0289* (2013.01); *G01N 2291/044* (2013.01)

(58) Field of Classification Search
CPC ...... G01N 2291/0289; G01N 2291/044; C21B 7/103; F27D 21/0021; F27D 21/04; F27B 1/28
USPC .......................................................... 73/584
See application file for complete search history.

(56) References Cited

FOREIGN PATENT DOCUMENTS

| | | | | |
|---|---|---|---|---|
| JP | H05338098 | A | * | 12/1993 |
| JP | H05338102 | A | * | 12/1993 |
| JP | H10253339 | A | * | 3/1997 |
| JP | 2016191564 | A | * | 11/2016 |
| WO | WO-2006089414 | A1 | * | 8/2006 .............. F27D 19/00 |

OTHER PUBLICATIONS

Translation JP-2016191564 (Year: 2016).*
Sadri, A., et al. A Comprehensive Review of Acousto Ultrasonic-Echo (AU-E) Technique for Furnace Refractory Lining Assessment, Aug. 23, 2015, Retrieved from the Internet: http://web.com.org/push_file.cfm?fn=meetings/abstracts/s101a865708753_en.pdf—Abstract only.
International Search Report and Written Opinion for PCT Application No. PCT/IB2018/057241, dated Nov. 28, 2018.

* cited by examiner

METHOD OF DETECTING CRACK PROPAGATION IN WALL OF A METALLURGICAL FURNACE AND A DETECTION UNIT

CROSS-REFERENCE TO RELATED APPLICATIONS

This application is a U.S. national phase of PCT Patent Application No. PCT/IB2018/057241, filed on Sep. 20, 2018, which claims priority to and the benefit of Indian Patent Application No. 201831012060, filed on Mar. 30, 2018, the contents of which are herein incorporated by reference in their entirety.

TECHNICAL FIELD

Present disclosure generally relates to a field of manufacturing technology. Particularly, but not exclusively, the present disclosure relates to a method of detecting crack propagation in a wall of a metallurgical furnace. Further, embodiments of the present disclosure disclose a detection unit for detecting crack propagation in the wall of the metallurgical furnace.

BACKGROUND OF THE DISCLOSURE

Metallurgical furnace such as, but not limiting to, blast furnaces are used for extraction of metals from raw materials. Typically, these metallurgical furnaces include a multilayer sidewall having an inner layer and an outer layer. The outer layer is usually a steel structural support and the inner layer includes a refractory lining consisting of one or more layers of refractory bricks or carbon blocks. In certain furnaces, a cooling layer may be provided between the inner layer and the outer layer as insulation, to prevent transfer of heat from the refractory lining to the outer layer.

During operation of the metallurgical furnace, the refractory lining is subjected to mechanical and thermal stresses due to heat generated within the metallurgical furnace. Additionally, a tuyere region of the metallurgical furnace comprising an inner most layer of the refractory lining is subjected to wear, due to relative motion of hot metal. These stresses along with wear, results in reduced overall thickness of the refractory lining, which is undesirable. Further, damage to the refractory lining results in a structural failure, which may lead to the outer layer being exposed to corrosive chemicals and molten material. Further, the outer layer would be incapable of containing the molten material and the corrosive chemicals, once the refractory lining is damaged. This leads to, the molten material and the corrosive chemicals leaking from the metallurgical furnace, which is hazardous and undesirable.

Conventionally, to overcome such limitations in the refractory lining, various systems for measuring thickness of refractory lining are employed. The systems generally operate based on non-destructive testing techniques, since the refractory lining is inaccessible to an operator from the inside of the blast furnace. The systems to determine the thickness of the refractory lining generally include, a plurality of thermocouples provided at predetermined locations in the wall of the metallurgical furnace. The plurality of thermocouples is configured to monitor the temperatures at each location in the wall. When a sudden increase in temperature is detected, the plurality of thermocouples provides warning signals to the operator for necessary precautionary measures. Though, this system provides warning signals upon detecting sudden increase in temperature, the system provides estimate readings pertaining to refractory lining as well as that of the other layers in the metallurgical furnace. Additionally, mounting these sensors in the wall of the metallurgical furnace is cumbersome and expensive.

Another system employed for measurement of the thickness of the wall of the metallurgical furnace, would be an acousto-ultrasonic technique. The technique involves using a transient propagated stress wave for determining condition of the refractory lining. The technique works based on the effect of velocity of the stress wave through a heated refractory lining. This system provides details pertaining to condition of the wall, and prevents need for providing plurality of thermocouples. However, this system interprets data of the stress wave such that, all the frequencies relate to the refractory lining or the carbon block. Thus, this procedure includes risk of misinterpreting the noise frequency, i.e. frequency which is not related to the refractory lining or the carbon block for knowing condition of the carbon block, leading to inaccurate measurements, which is undesirable.

Thus, there exists a need for a method of determining crack propagation in the wall of the metallurgical furnace, for accurate assertion of condition of the wall of the metallurgical furnace.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE DISCLOSURE

The present disclosure relates to a method of detecting crack propagation in a wall of a metallurgical furnace by a detection unit. The detection unit comprising transmitting, by a signal generating unit of the detection unit, a stress signal into the wall, at one or more locations on the wall of the metallurgical furnace. Receiving, by a detection unit, a reflected stress signal from each of the one or more locations based on the corresponding stress signal. Extracting, by the detection unit, one or more dominant frequency parameters from the corresponding reflected stress signal, from each of the one or more locations; and analysing, by the detection unit, a phase from each of the one or more dominant frequency parameters for a corresponding location of the one or more locations. The analyzing of the phase comprises determining, by the detection unit, one or more coefficients for each of the one or more dominant frequency parameters based on the reflected stress signal and a reference signal. Identifying, by the detection unit, a dominant phase for each of the one or more dominant frequency parameters based on the corresponding one or more coefficients. Selecting, by the detection unit, a frequency relevant to a thickness parameter from the one or more dominant frequency parameters for the corresponding location on the wall, based on the dominant phase, and detecting, by the detection unit, the crack propagation in the wall of the metallurgical furnace based on the frequency relevant to the thickness parameter at each of the one or more locations.

In an embodiment, the detection unit determines the crack propagation in the wall, by computing, a thickness value based on the frequency relevant to the thickness parameter, wherein the thickness value corresponds to thickness of each of a plurality of layers in the wall at the one or more locations, and comparing, the thickness values of one location of the one or more locations with the corresponding thickness value at other location of the one or more locations, to determine the crack in the wall.

In an embodiment, the detection unit, modulates the reflected stress signal with the reference signal for determining the one or more coefficients for each of the one or more dominant frequency parameters.

In an embodiment, the detection unit computes each of the one or more coefficient points, by incrementing each of one or more predefined phase values in the reference signal, wherein the one or more predefined phase values ranges from about 0 degrees to about 360 degrees.

In an embodiment, the detection unit generates a coefficient plot based on the one or more coefficients and the one or more predefined phase values for identifying the dominant phase for each of the one or more dominant frequency parameters, wherein one or more peak values of the coefficient plot is detected for identifying the dominant phase.

In an embodiment, the reflected stress signal is in a time-domain parameter.

In an embodiment, the detection unit converts the reflected stress signal in the time domain parameter to a frequency domain parameter, for determining one or more dominant frequency parameters in the reflected stress signal.

In another non-limiting embodiment of the present disclosure, a detection unit for detecting crack propagation in a wall of a metallurgical furnace is disclosed. The detection unit comprising a signal generating unit, for transmitting a stress signal to propagate in the wall at one or more locations. A processor and a memory is communicatively coupled to the processor. The memory stores processor-executable instructions, which, on execution, causes the processor to receive, a reflected stress signal for each of the one or more locations based on the corresponding stress signal. Extract, one or more dominant frequency parameters from the corresponding reflected stress signal, for each of the one or more locations and analyze a phase, of each of the one or more dominant frequency parameters for a corresponding location from the one or more locations. The analysis comprises determining, by the detection unit, one or more coefficients for each of the one or more dominant frequency parameters based on the reflected stress signal and a reference signal. Identifying, by the detection unit, a dominant phase for each of the one or more dominant frequency parameters based on the corresponding one or more coefficients. Selecting, by the detection unit, a frequency relevant to a thickness parameter from the one or more dominant frequency parameters for the corresponding location on the wall, based on the dominant phase and detecting, by the detection unit, the crack propagation in the wall of the metallurgical furnace based on the frequency relevant to the thickness parameter at each of the one or more locations.

In an embodiment, the detection unit includes at least one sensor unit for receiving the reflected stress signal from the wall.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended description. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
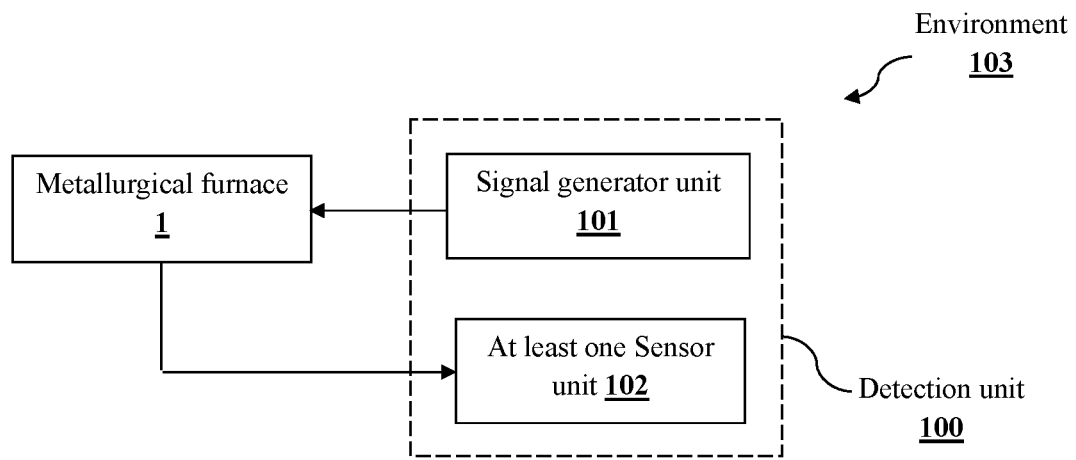
FIG. 1 illustrates a schematic view of a detection unit associated with a metallurgical furnace for detecting crack propagation in a wall of the metallurgical furnace, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE DISCLOSURE

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure provides a method and a detection unit for determining crack propagation in a wall of a metallurgical furnace. The method is configured to compute characteristic details pertaining to refractory lining of the metallurgical furnace such as but not limiting to a thickness value. The method is configured to filter out irrelevant data such as a noise signal, to obtain an accurate estimate of the condition of the wall of the metallurgical furnace.

FIG. 1 in one exemplary embodiment of the present disclosure illustrates an environment (103) for determining crack propagation in a wall (2) of a metallurgical furnace (1). The environment (103) is configured to include various components that may be common to any metallurgical industries, where the metallurgical furnace (1) is operated. In the present disclosure, the crack propagation in the wall (2) of the metallurgical furnace (1) is detected based on a phase shift analysis of a stress signal transmitted through the wall (2).

Figure 2:
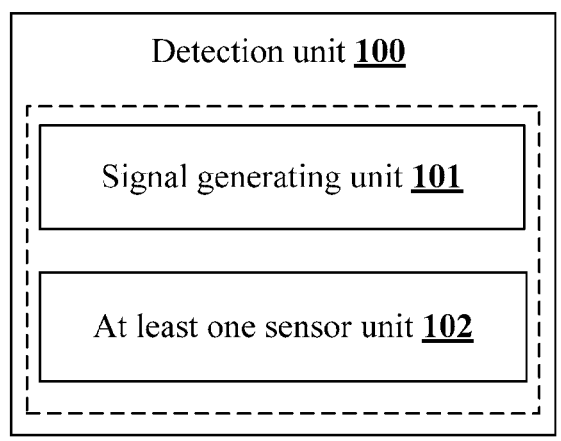
FIG. 2 illustrates a block diagram of the detection unit of FIG. 1, in accordance with an embodiment of the present disclosure.

The environment (103) comprises a signal generating unit (101) and at least one sensor unit (102). The signal generating unit (101) is configured to transmit the stress signal into the wall (2) of the metallurgical furnace (1) at one or more locations (3) [shown in FIG. 4]. The stress signal propagates into the wall (2), and is reflected back as a reflected stress signal. The reflected stress signal is received by the at least one sensor unit (102), which may be placed adjacent to the point of transmission of the stress signal on the wall (2). The at least one sensor unit (102), may transmit the reflected stress signal to a control unit or a processor for further analysis of the reflected stress signal. The combination of the signal generating unit (101) and the at least one sensor unit (102) forms a detection unit (100) [as shown in FIG. 2] for detecting crack propagation in the wall (2) of the metallurgical furnace (1).

In an embodiment, the signal generating unit (101) may be a mechanical signal generating unit, an electro-mechanical signal generating unit or an electronic signal generating unit, configured to transmit the stress signal into the wall (2). In an embodiment, and for the sake of simplicity, the signal generating unit (101) may be a mechanical signal generating unit such as a hammer, operated by striking an impact on the wall (2) by an operator for transmitting the stress signal into the wall (2). In one embodiment, if the signal generating unit (101) is mechanical signal generating unit, then detection unit (100) may include only the at least one sensor unit (102) for capturing the reflected stress signal.

In an embodiment, the at least one sensor unit (102) is at least one of an active transducer or passive transducer, such as but not limiting to piezoelectric transducer, pressure transducer and the like.

In an embodiment, the stress signal is at least one of an analog signal, a digital signal or both, such as but not limiting to an acoustic signal, mechanical signal and the like which serves the requirement.

Figure 3:
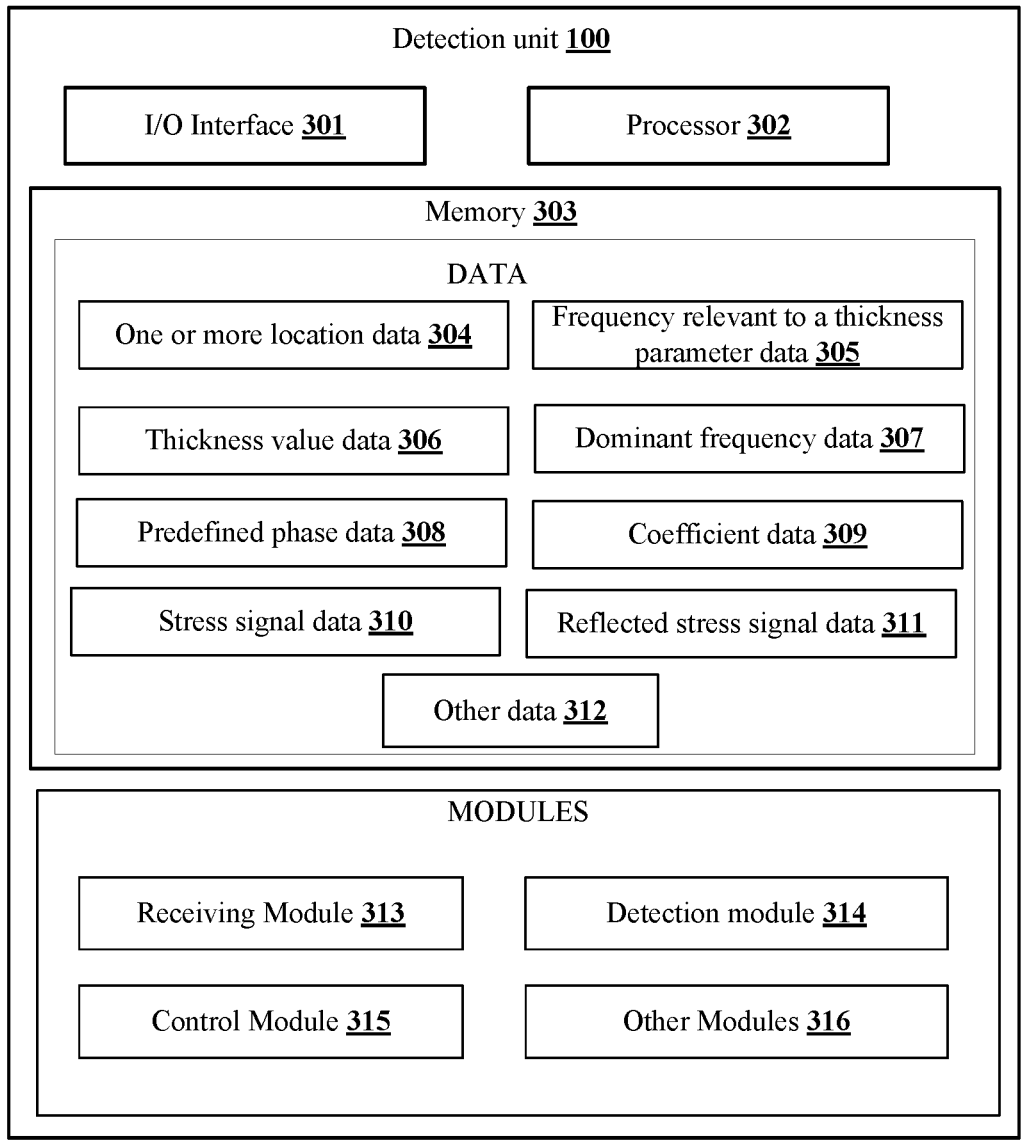
FIG. 3 illustrates another block diagram of the detection unit configured for detecting crack propagation in the wall, in accordance with an embodiment of the present disclosure.

FIG. 3 in one exemplary embodiment of the present disclosure illustrates a block diagram of the detection unit (100) for detecting crack propagation in the wall (2) of the metallurgical furnace (1). The detection unit (100) comprises an I/O interface (301), a processor (302) and a memory (303). The memory (303) is communicatively coupled to the processor (302).

The processor (302) is configured to perform one or more functions of the detection unit (100) for detecting crack propagation in the wall (2). In one implementation, the detection unit (100) comprises data and modules for performing various operations in accordance with the embodiments of the present disclosure. In an embodiment, the data may include, without limiting to, one or more location data (304), frequency relevant to a thickness parameter data (305), thickness value data (306) dominant frequency data (307), predefined phase data (308), coefficient data (309), stress signal data (310), reflected stress signal data (311) and other data (312).

In an embodiment, the detection unit (100) may comprise a controller instead of the processor (302) for performing the functionalities of the detection unit (100) for detecting crack propagation in the wall (2).

In one embodiment, the data may be stored within the memory (303) in the form of various data structures. Additionally, the aforementioned data can be organized using data models, such as relational or hierarchical data models. The other data (312) may store data, including temporary data and temporary files, generated by modules for performing the various functions of the detection unit (100).

In an embodiment, the data may be processed by one or more modules. In one implementation, the one or more modules may also be stored as a part of the processor (302). In an example, the one or more modules may be communicatively coupled to the processor (302) for performing one or more functions of the detection unit (100).

In one implementation, the one or more modules may include, without limiting to, receiving module (313), detection module (314), control module (315) and other modules (316).

As used herein, the term module refers to an application specific integrated circuit (ASIC), an electronic circuit, a processor (302) (shared, dedicated, or group) and memory (303) that execute one or more software or firmware programs, a combinational logic circuit, and/or other suitable components that provide the described functionality.

In an embodiment, the receiving module (313) may receive the one or more location data (304) from the detection unit (100) based on the location of the signal generating unit (101) through the I/O Interface (301). The receiving module (313) based on the one or more location data (304) determines the location of transmission of the stress signal into the wall (2). In an embodiment, the one or more location data (304) is selected in a tuyere portion of the metallurgical furnace (1). In an embodiment, the one or more location data (304) is selected along entire circumference of the metallurgical furnace (1).

In an embodiment, the receiving module (313) configured in the detection unit (100) may receive the frequency relevant to the thickness parameter data (305), computed by the detection unit (100) during detection of the crack propagation in the wall (2). The frequency relevant to the thickness parameter data (305) may represent a frequency relevant to thickness parameter ($f_t$) [shown in FIG. 7$d$], configured for measurement of the thickness value (t), based on the reflected stress signal. That is, the frequency relevant to the thickness parameter data (305) is the data pertaining to the frequency relevant to the thickness parameter ($f_t$) corresponding to the one or more dominant frequency parameters ($f_d$), which is obtained after a phase analysis of the reflected stress signal.

In an embodiment, the receiving module (313) configured to the detection unit (100) may receive the thickness value data (306), computed by the detection unit (100) during detection of the crack propagation in the wall (2). The thickness value data (306) may represent the thickness value (t) computed by the detection unit (100) based on the frequency relevant to thickness parameter data (305). In an embodiment, each thickness value data (306) may provide the thickness value (t) for a plurality of layers (2$a$) of the wall (2).

In an embodiment, the receiving module (313) configured to the detection unit (100) may receive the dominant frequency data (307), extracted by the detection unit (100) during detection of the crack propagation in the wall (2). The dominant frequency data (307) may represent the frequency corresponding to the plurality of layers (2$a$) of the wall (2), extracted by the detection unit (100), from the reflected stress signal. The dominant frequency data (307) thus corresponds to the characteristic of each of the plurality of layers (2$a$) of the wall (2). In an exemplary embodiment, if the plurality of layers (2$a$) includes a steel layer, a cooling layer and a carbon black layer, the reflected stress signal may include three dominant frequency data [$f_{d1}$, $f_{d2}$ and $f_{d3}$], for each of the steel layer, the cooling layer and the carbon black layer in the reflected stress signal. The dominant frequency data (307) may enable the detection unit (100) to isolate the computed values, from the values computed for other dominant frequency data (307). Thus, enable the operator to emphasize on the readings necessary for detection of crack propagation in the wall (2).

In an embodiment, the receiving module (313) configured in the detection unit (100) may receive the predefined phase data (308), from the detection unit (100) during detection of the crack propagation in the wall (2). The predefined phase data (308) includes phase angle of a reference signal, which is superimposed on the reflected stress signal during computation of the frequency relevant to thickness parameter ($f_t$). The predefined phase data (308) may include phase angle of the reference signal ranging from about 0 degrees to about 360 degrees.

In an embodiment, the receiving module (313) configured in the detection unit (100) may receive one or more coefficients (Y), computed by the detection unit (100) during detection of the crack propagation in the wall (2). The coefficient data (309) may represent an average amplitude parameter of a resultant signal obtained after super-imposing the reflected stress signal with the reference signal. The coefficient data (309) enables generation of the coefficient plot for determining the frequency relevant to the thickness parameter, thereby enabling determination of the thickness value (t) of the plurality of layers (2$a$) of the wall (2).

In an embodiment, the receiving module (313) configured in the detection unit (100) may receive the stress signal data (310), provided by the signal generating unit (101). The stress signal data (310) may include signal parameters such as, but not limiting to, frequency, amplitude, phase and the like, transmitted into the wall (2). The stress signal data (310) may enable the detection unit (100) to determine the signal parameters of the reflected stress signal.

In an embodiment, the receiving module (313) configured in the detection unit (100) may receive the reflected stress signal data (311), received by the at least one sensor unit (102). The reflected stress signal data (311) may include signal parameters such as, but not limiting to, frequency, amplitude, phase and the like, the reflected stress signal to enable the detection unit (100) to analyse the signal and determine crack propagation in the wall (2).

In an embodiment, the detection module (314) may detect crack propagation in the wall (2), based on the thickness value (t) determined by the detection unit (100) at the one or more locations (3). The detection module (314) may compute difference of the thickness value (t) of corresponding one or more dominant frequency parameters ($f_d$) at the one or more locations (3), for determination of the crack propagation in the wall (2).

In an embodiment, the control module (315) may be configured to control operation of the detection unit (100) during detection of the crack propagation in the wall (2).

Figure 4:
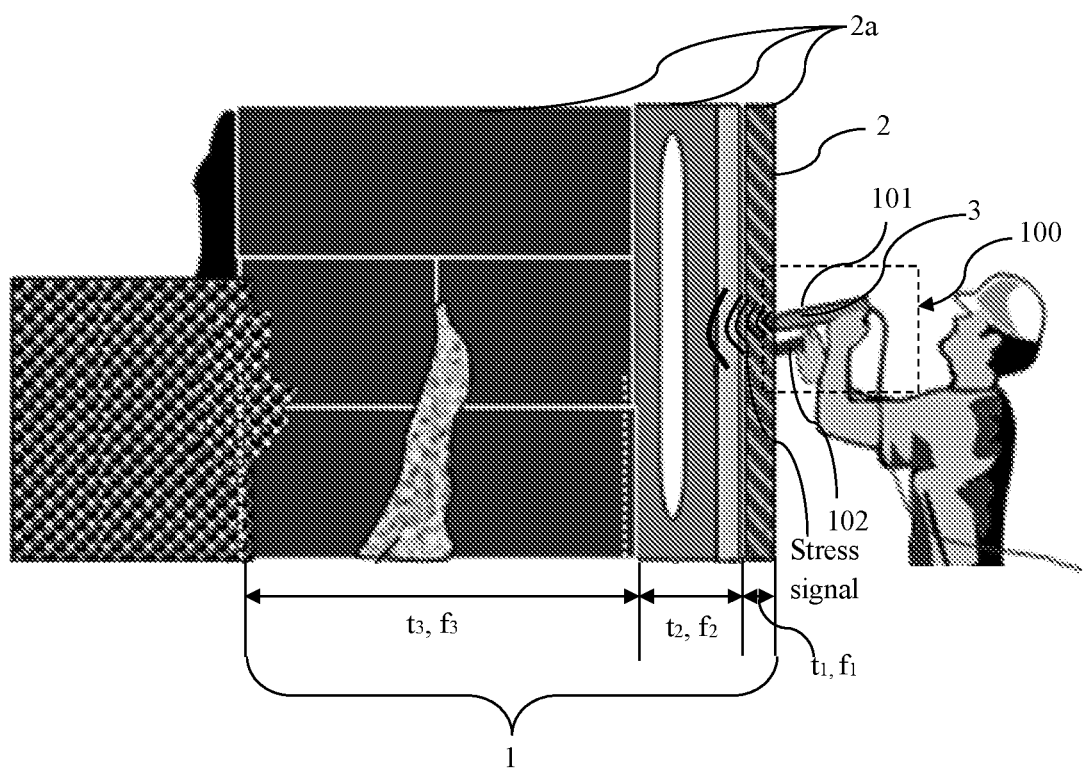
FIG. 4 illustrates a schematic view of the metallurgical furnace, with a stress signal being transmitted by an operator, in accordance with an embodiment of the present disclosure.

FIG. 4 in one exemplary embodiment of the present disclosure illustrates operation of the detection unit (100) for detecting crack propagation in the wall (2) of the metallurgical furnace (1).

The operator may position the signal generating unit (101) at the one or more locations (3) for determining crack propagation in the wall (2). The operator may strike the one or more locations (3) using a hammer, for transmitting the stress signal into the wall (2). The stress signal propagates inside the wall (2), and is reflected back as the reflected stress signal. Subsequently, the operator may place the at least one sensor unit (102) adjacent to the one or more locations (3), for receiving the reflected stress signal based on the corresponding stress signal. The reflected stress signal received by the at least one sensor unit (102) is the time domain signal [as shown in FIG. 7$a$], which includes all the information pertaining to the composition, cracks, dislocations and the like of each of the plurality of layers (2$a$) of the wall (2). The reflected stress signal is transmitted to the detection unit (100) by the reflected stress signal for analysis and detection of the crack propagation.

Upon receiving the reflected stress signal, the detection unit (100) converts the reflected stress signal from the time domain parameter to a frequency domain parameter. The detection unit (100) converts the reflected stress signal from the time domain parameter to the frequency domain parameter [as shown in FIG. 7$b$] by using Fast Fourier Transform [FFT] method. In an embodiment, the reflected stress signal from the time domain parameter may be converted to the frequency domain parameter by the detection unit (100), by other analysis methods not limiting to Fast Fourier Transform [FFT]. The reflected stress signal in the frequency domain parameter is configured to include one or more dominant frequency parameters ($f_d$) which is extracted by the detection unit (100) from each of the one or more locations (3). In an embodiment, the number of one or more dominant frequency parameters ($f_d$) may correspond to number of the plurality of layers (2$a$) in the wall (2). As an example, the plurality of layers (2a) are three, the number of one or more dominant frequency parameter ($f_d$) would be three [$fd_1$, $fd_2$ and $fd_3$].

In an embodiment, each of the one or more dominant frequency parameters (fd) may include characteristic such as thickness, cracks, undulations and the like of the corresponding layer in the plurality of layers (2a). Thus, considering one of the one or more dominant frequency parameter ($f_d$) corresponds to measurement of characteristics of the corresponding layer of the plurality of layers (2a).

Subsequently, the detection unit (100) is configured to analyze a phase of the one or more dominant frequency parameters ($f_d$) for a corresponding location of the one or more locations (3). The phase is determined by the detection unit (100), by firstly determining the one or more coefficients (Y) for each of the one or more dominant frequency parameters ($f_d$). The one or more coefficients (Y) are determined by modulating the reflected stress signal with a reference signal, wherein the reference signal is selected such that the frequency of the reference signal ($f_r$) [shown in FIG. 7c] matches with the each of the one or more dominant frequency parameters ($f_d$). The resultant signal due to the modulation, results in an average amplitude signal yielding a corresponding coefficient of the one or more coefficients (Y).

In an embodiment, the reference signal is given by the below equation Eq. 1.

$$Y = \sin(ft + \varnothing) \quad \text{Eq. 1.}$$

Wherein,

Y may be the one or more coefficients;

f may be the frequency of the reference signal, equal to each of the one or more dominant frequency parameters ($f_d$);

t may be a time parameter;

Ø may be one or more predefined phase values.

By computing the above Eq. 1, with the known values and with the one or more predefined phase values (Ø), the corresponding coefficient of the one or more coefficients (Y) is determined. The computation is carried out by the detection unit (100), by incrementing the values of the one or more predefined phase values (Ø), for obtaining the corresponding coefficients of the one or more coefficients (Y). In an embodiment, the one or more predefined phase values (Ø) ranges from about 0 degrees to about 360 degrees.

In an exemplary embodiment, if $Y_1$ is the corresponding coefficient obtained for the phase value of $\varnothing_1$, then for $\varnothing_2$ the corresponding coefficient would be $Y_2$. In other words, for $\varnothing_{[1-360]}$ the corresponding coefficients of the one or more coefficients (Y) would be $Y_{[1-360]}$.

Figure 7A:
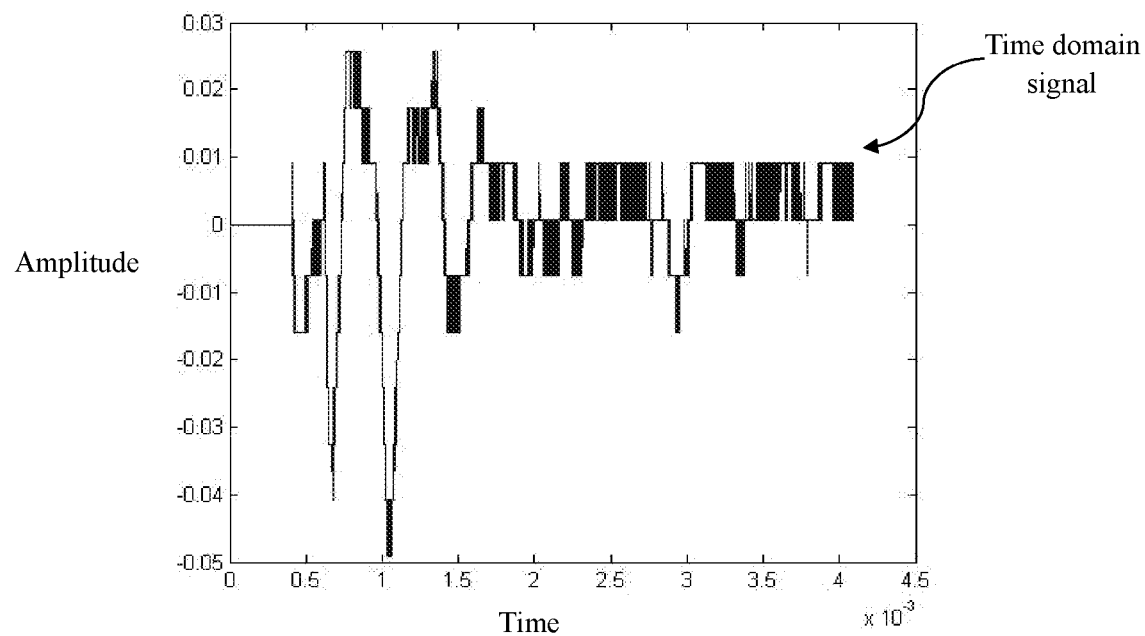
FIG. 7a illustrates a graphical representation of a reflected stress signal in time domain parameter, in accordance with an embodiment of the present disclosure.
Figure 7B:
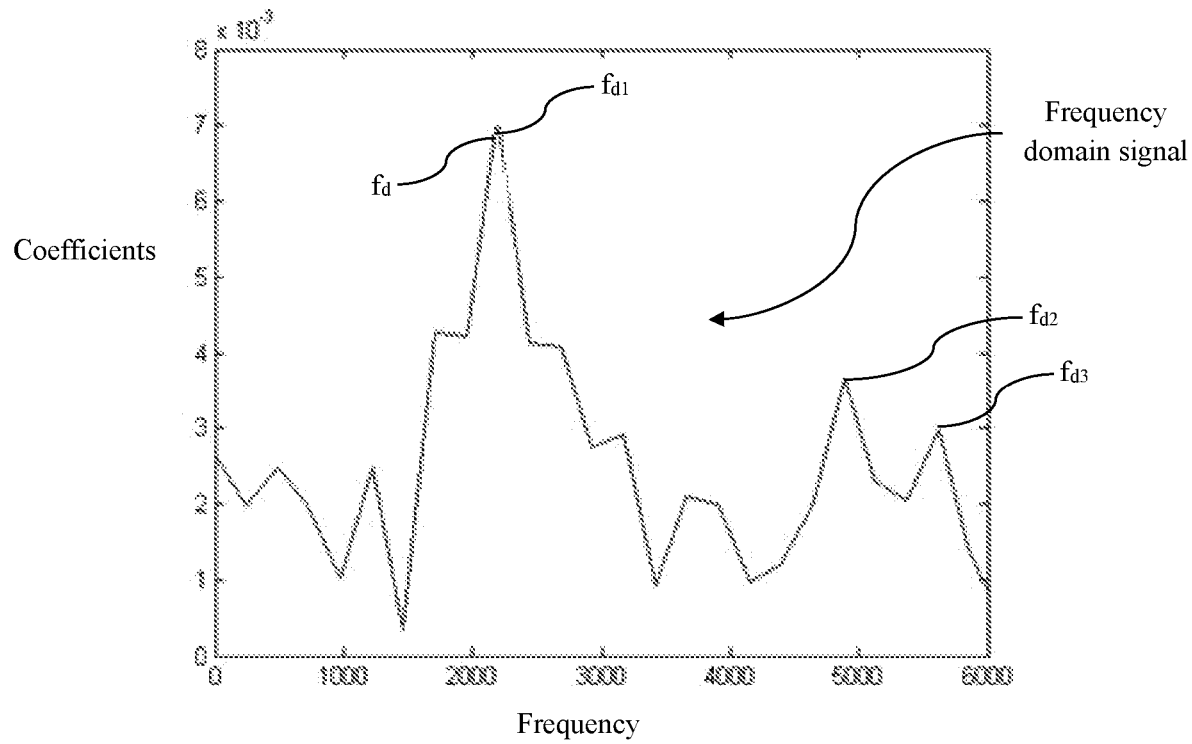
FIG. 7b illustrates a graphical representation of the reflected stress signal converted to a frequency domain parameter, in accordance with an embodiment of the present disclosure.
Figure 7C:
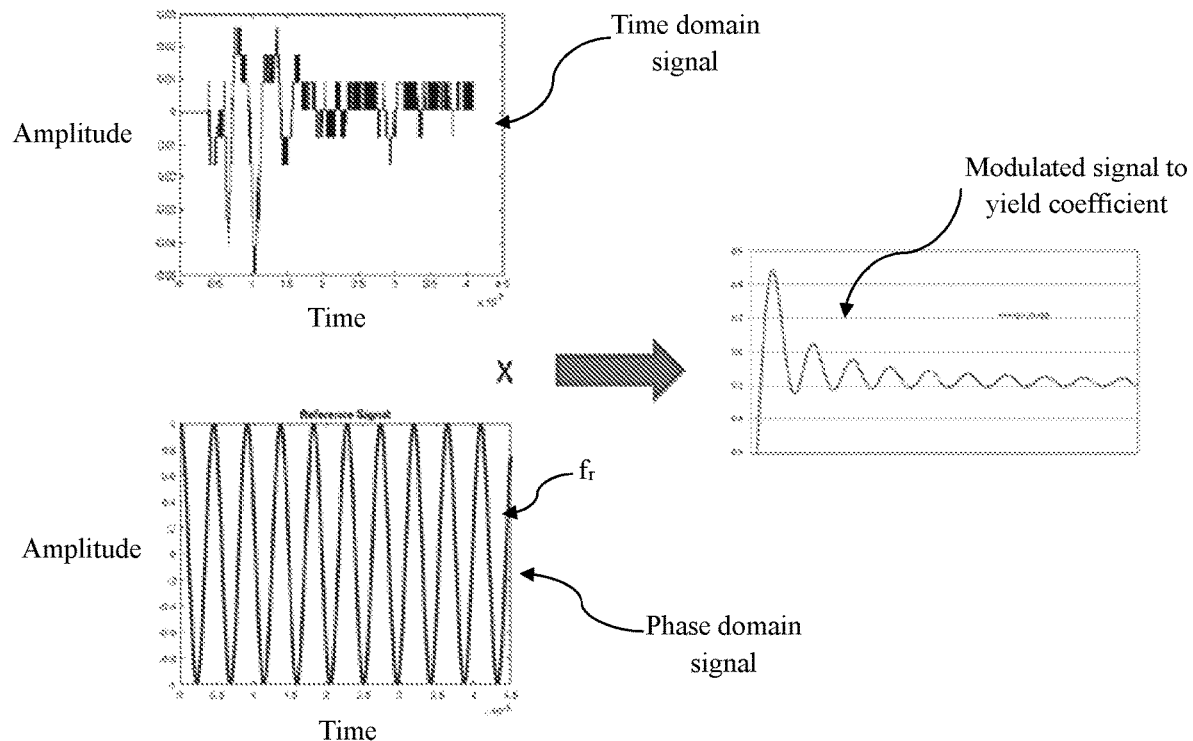
FIG. 7c illustrates a graphical representation of the reflected stress signal modulated to a phase domain, in accordance with an embodiment of the present disclosure.
Figure 7D:
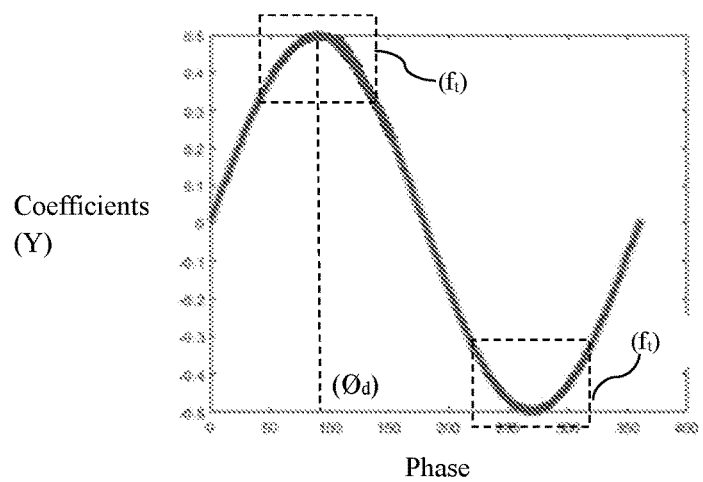
FIG. 7d illustrates a graphical representation of a coefficient plot obtained after modulating the reflected stress signal, in accordance with an embodiment of the present disclosure.

Upon determining the one or more coefficients (Y), the detection unit (100) generates a coefficient plot [as shown in FIG. 7d] based on the one or more coefficients (Y) and the one or more predefined phase value (Ø). In an embodiment, the coefficient plot is a sinusoidal curve. The detection unit (100), based on the coefficient plot identifies a dominant phase ($\varnothing_d$) [as shown in FIG. 7d] of the corresponding one or more dominant frequency parameters ($f_d$). In an embodiment, the peak values in the coefficient plot may represent the dominant phase ($\varnothing_d$) of the corresponding one or more dominant frequency parameters ($f_d$). Subsequently, the detection unit (100) determines the frequency relevant to the thickness parameter based on the dominant phase ($\varnothing_d$). The frequency relevant to the thickness parameter upon computation by the detection unit (100), determines the thickness value (t) for the corresponding one or more dominant frequency parameters ($f_d$). As, each of the one or more dominant frequency parameters ($f_d$) corresponds to each of the plurality of layers (2a), the thickness value (t) thus, represents thickness of the corresponding layer in the plurality of layers (2a). In an embodiment, for the wall (2) having the three layers, the thickness value (t) may be [$t_1$, $t_2$ and $t_3$].

Subsequently, the detection unit (100), performs the aforementioned method for each of the one or more locations (3), and consequently determines the thickness value (t) for each of the plurality of layers (2a). The detection unit (100), compares the thickness value (t) obtained for the corresponding plurality of layers (2a) for determining crack propagation in the wall (2) of the metallurgical furnace (1).

In an exemplary embodiment, consider the thickness value (t) obtained for carbon block is 0.4 m at one location of the one or more locations (3) and the thickness value (t) is 0.2 m at another location. The detection unit (100) computes difference between these values, and since for the same layer includes variations in the value computed, the detection unit (100) detects that crack is propagating in that layer of the plurality of layers (2a).

In an embodiment, the detection unit (100), provides a warning signal or an alert to the user, upon determination of crack propagation in the wall (2) of the metallurgical furnace (1).

In an embodiment, analysis of the phase is carried out by phase shift method.

Figure 5:
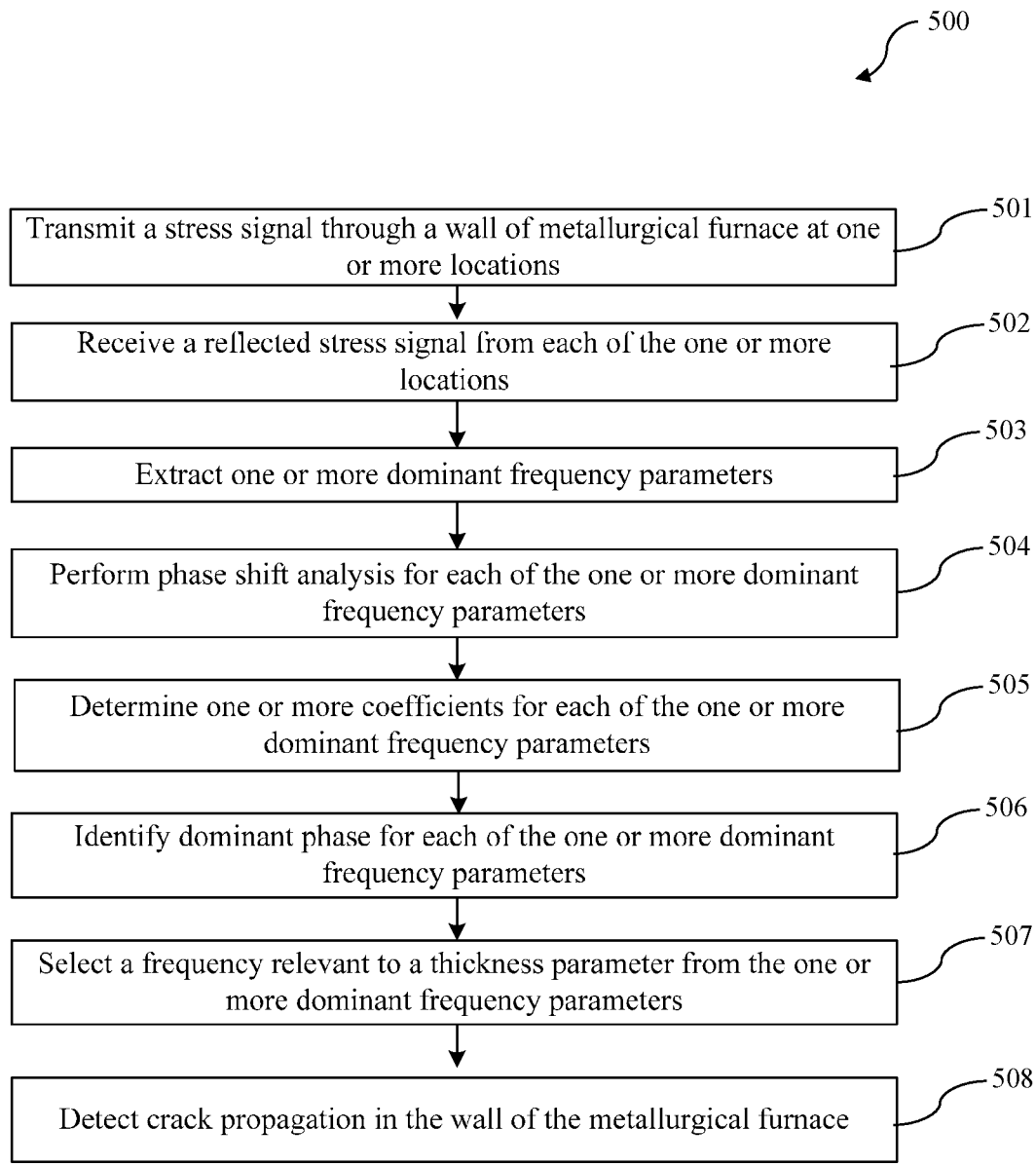
FIG. 5 illustrates a flow chart for detecting crack propagation in the wall, in accordance with an embodiment of the present disclosure.

FIG. 5 in one exemplary embodiment of the present disclosure illustrates a flowchart of a method for detecting crack propagation by the detection unit (100).

At block 501, the signal generating unit (101) located at the one or more locations (3), transmits the stress signal into the wall (2) at the one or more locations (3). In an exemplary embodiment, the signal generating unit (101) is the hammer, wherein the operator strikes the wall (2) manually to transmit the stress signal into the wall (2), wherein the stress signal is the acoustic sound signal. In an embodiment, the signal generating unit (101) may be operated manually by the operator for transmitting the stress signal. In another embodiment, the signal generating unit (101) may be automatically operated after placing at each of the one or more locations (3), for transmitting the stress signal.

At block 502, the stress signal propagates within the wall (2) and is reflected back as the reflected stress signal. The reflected stress signal from each of the one or more locations (3) is received by the at least one sensor unit (102). The at least one sensor unit (102) is positioned adjacent to the signal generating unit (101), for receiving the reflected stress signal. In an embodiment, the at least one sensor unit (102) may be configured to receive the reflected stress signal from each of the one or more locations (3) from a single location.

At block 503, the detection unit (100) is configured to extract the one or more dominant frequency parameters ($f_d$) from the reflected stress signal. For extracting the one or more dominant frequency parameters ($f_d$), the detection unit (100), converts the reflected stress signal in the time domain parameter as received by the at least one sensor unit (102), into the frequency domain parameter. By conversion of the time domain signal to the frequency domain signal, the values pertaining to each of the plurality of layers (2a) of the wall (2) are segregated. Since segregation of required parameters based on time domain parameter would be cumbersome and will generally be associated with noise or unwanted signals. The reflected stress signal in the frequency domain parameter includes one or more dominant frequency parameters ($f_d$), which corresponds to frequencies of each of the plurality of layers (2a) of the wall (2). The detection unit (100), extracts the one or more dominant frequency parameters ($f_d$) from the reflected stress signal in the frequency domain parameter.

At block 504, the detection unit (100), detects the phase of each of the one or more dominant frequency parameters ($f_d$). For detecting the phase, the detection unit (100) modulates the reflected stress signal with the reference signal based on the one or more predefined phase values (Ø), wherein the reference signal is configured with the corresponding one or more dominant frequency parameters ($f_d$). The modulation provides the coefficient of the one or more coefficients (Y) corresponding to the phase value [as referred in block 505]. The detection unit (100) performs computation of the one or more coefficients (Y) for each value of the one or more predefined phase values (Ø). The one or more coefficients (Y) are then plotted, to generate the coefficient plot. The peak value of the coefficient plot determines the phase of the corresponding one or more dominant frequency parameters ($f_d$). The determined phase is the dominant phase ($Ø_d$) of the corresponding one or more dominant frequency parameters ($f_d$) [as referred in block 506].

Figure 6:
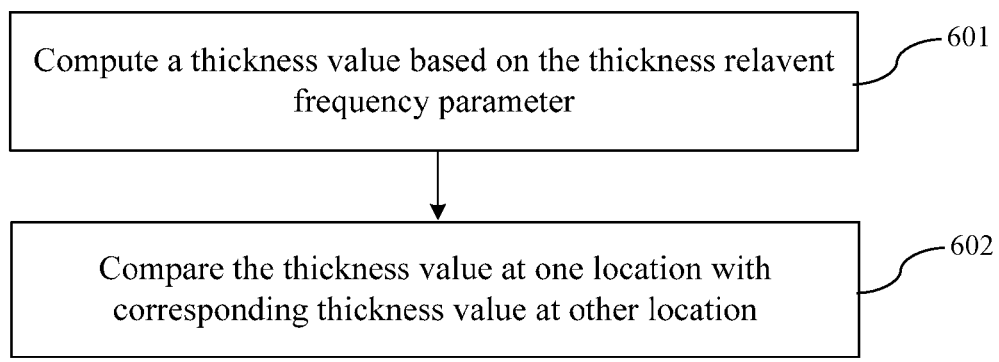
FIG. 6 illustrates a flow chart for computing thickness values for detecting crack propagation in the wall, in accordance with an embodiment of the present disclosure.

At block 507, in conjunction with block 601 of FIG. 6, the detection unit (100) determines the frequency relevant to thickness parameter ($f_t$) based on the dominant phase ($Ø_d$). The frequency relevant to thickness parameter ($f_t$), upon computation by the detection unit (100), provides the thickness value (t) for the corresponding one or more dominant frequency parameters ($f_d$). The detection unit (100) subsequently computed the thickness value (t) for other locations of the one or more locations (3), corresponding to the one or more dominant frequency.

Figure 8:
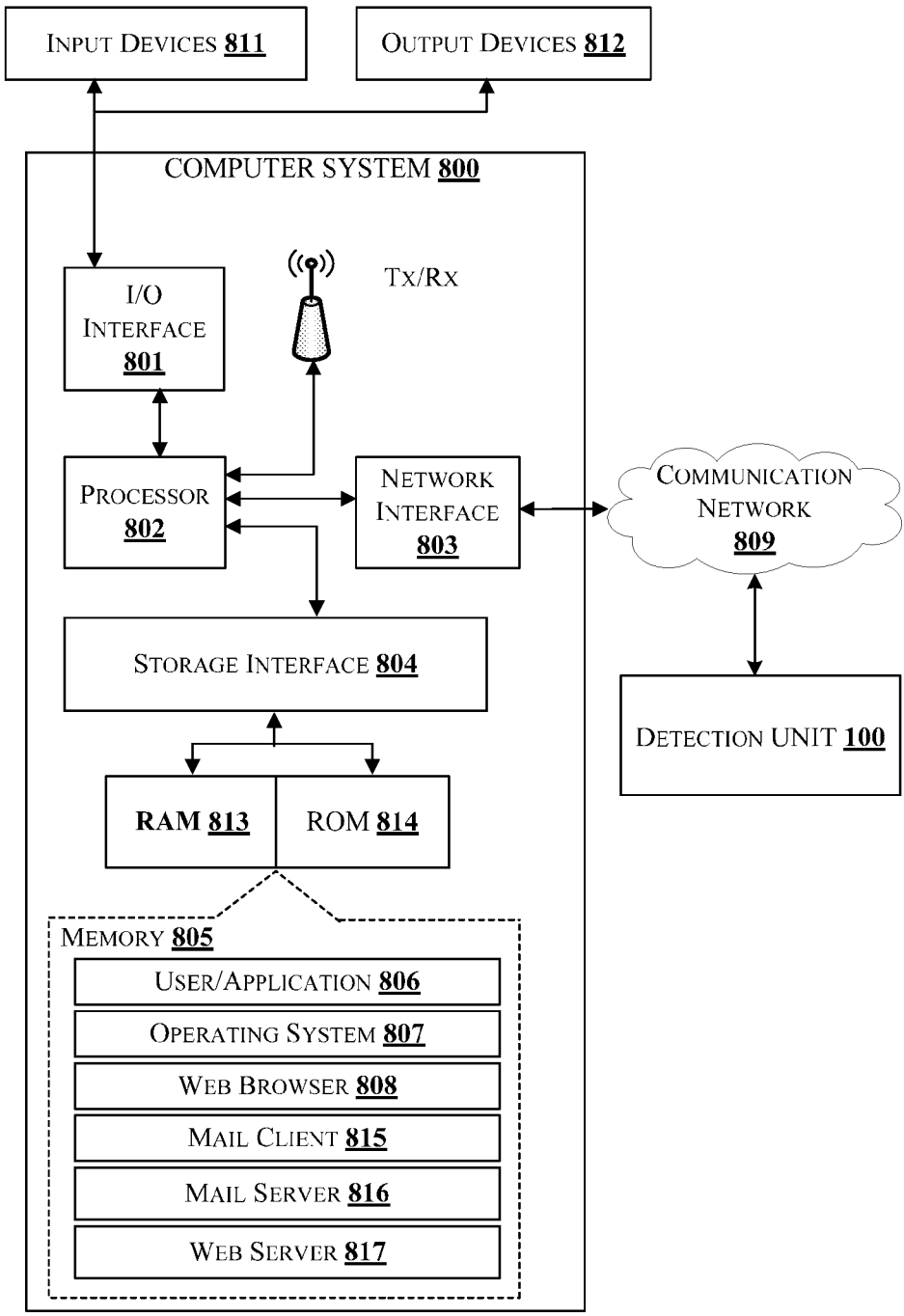
FIG. 8 illustrates a block diagram of an exemplary computer system for implementing embodiments consistent with the present disclosure.

At block 508, in conjunction with block 602 of FIG. 6, the detection unit (100), compares the thickness value (t) of the corresponding one or more dominant frequency parameters ($f_d$). During comparison, when the detection unit (100) detects variation in the thickness value (t) for the corresponding one or more dominant frequency parameters ($f_d$), the detection unit (100) detects crack propagation in the wall (2).

computer system (800) FIG. 8 in one exemplary embodiment of the present disclosure illustrates a block (501) diagram of a computer system (800) for implementing embodiments consistent with the present disclosure. In an embodiment, the computer system (800) can be the detection unit (100) configured detecting crack propagation in the wall (2) of the metallurgical furnace (1). The computer system (800) may comprise a central processing unit ("CPU" or "processor") 802. The processor (802) may comprise at least one data processor for executing program components for executing user- or system-generated processes. The processor may include specialized processing units such as integrated system (bus) controllers, memory management control units, floating point units, graphics processing units, digital signal processing units, etc.

The processor (802) may be disposed in communication with one or more input/output (I/O) devices (811 and 812) via an I/O interface (801). The I/O interface (801) may employ communication protocols/methods such as, without limitation, audio, analog, digital, stereo, ieee (802)-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface (801), the computer system (800) may communicate with the one or more I/O devices (811 and 812).

In an embodiment, the processor (802) may be disposed in communication with a communication network (809) via a network interface (803). The network interface (803) may communicate with the communication network (809). The network interface (803) may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network (809) can be implemented as one of the different types of networks, such as intranet or Local Area Network (LAN) and such within the organization. The communication network (809) may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network (809) may include a variety of network devices (811), including routers, bridges, servers, computing devices (811), storage devices (811), etc.

In an embodiment, the processor may be disposed in communication with a memory (805) (e.g., RAM 813, ROM 814, etc.) via a storage interface. The storage interface (804) may connect to memory including, without limitation, memory drives, removable disc drives, etc., employing connection protocols such as Serial Advanced Technology Attachment (SATA), Integrated Drive Electronics (IDE), ieee-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory may store a collection of program or database components, including, without limitation, user/application data, an operating system, web browser etc. In some embodiments, computer system may store user/application data, such as the data, variables, records, etc. as described in this disclosure. Such databases may be implemented as fault-tolerant, relational, scalable, secure databases such as Oracle or Sybase.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access memory (ram), Read-Only memory (rom), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method for determining crack propagation in the wall of the metallurgical vessel by filtering unwanted or by noise signal cancellation. Thereby, improving accuracy of the readings obtained.

In an embodiment, the present disclosure provides the method for determining thickness of each of the plurality of layers in the wall, separately.

In an embodiment, the present disclosure provides the method for accurately determining condition of the refractory lining of the metallurgical furnace.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals | Description |
|---|---|
| 100 | Detection unit |
| 101 | Signal generating unit |
| 102 | At least one sensor unit |
| 103 | Environment |
| 1 | Metallurgical furnace |
| 2 | Wall |
| 2a | Plurality of layers |
| 3 | One or more locations |
| 301 | I/O Interface |
| 302 | Processor |
| 303 | Memory |
| 304 | One or more location data |
| 305 | frequency relevant to thickness parameter data |
| 306 | Thickness value data |
| 307 | Dominant frequency data |
| 308 | Predefined phase data |
| 309 | Coefficient data |
| 310 | Stress signal data |
| 311 | Reflected tress signal data |
| 312 | Other data |
| 313 | Receiving module |
| 314 | Detection module |
| 315 | Control module |
| 316 | Other modules |
| $f_r$ | Frequency of the reference signal |
| t | Thickness value |
| $f_d$ | One or more dominant frequency parameters |
| Y | One or more coefficients |
| Ø | One or more predefined phase values |
| $(Ø_d)$ | Dominant phase |
| $(f_t)$ | Frequency relevant to a thickness parameter |

The invention claimed is:

1. A method of detecting crack propagation in a wall of a metallurgical furnace having two or more layers, by a detection unit, the detection unit comprising a signal generating unit, at least one sensor unit, a processor, a memory, and an I/O interface, the method comprising: transmitting, by the signal generating unit of the detection unit, a stress signal into the wall, at one or more locations on the wall of the metallurgical furnace; receiving, by the processor of the detection unit through the at least one sensor unit, a reflected stress signal from each of the one or more locations based on the corresponding stress signal transmitted at each of the one or more locations; extracting, by the processor of the detection unit, one or more dominant frequency parameters (fa) from the corresponding reflected stress signal, from each of the one or more locations, each of the one or more dominant frequency parameters (fa) corresponding to a respective one of the two or more layers; analyzing, by the processor of the detection unit, a phase from each of the one or more dominant frequency parameters (fa) for a corresponding location of the one or more locations, wherein analyzing the phase comprises: determining, by the processor of the detection unit, one or more coefficients (Y) for each of the one or more dominant frequency parameters (fa) based on the reflected stress signal and a reference signal; identifying, by the processor of the detection unit, a dominant phase (O) for each of the one or more dominant frequency parameters (fa) based on the corresponding one or more coefficients (Y), selecting, by the processor of the detection unit, a frequency relevant to a thickness parameter (ft) of a layer of the two or more layers from the one or more dominant frequency parameters (fa) for the corresponding location on the wall, based on the dominant phase (O), and detecting, by the processor of the detection unit, the crack propagation in the wall of the metallurgical furnace based on analyzing the frequency relevant to the thickness parameter (ft) at each of the one or more locations; and responsive to detecting the crack propagation in the wall of the metallurgical furnace, providing, by the processor of the detection unit via the I/O interface, an alert indicating the crack propagation in the wall.

2. The method as claimed in claim 1, wherein determining the crack propagation in the wall by the processor of the detection unit includes: computing a thickness value (t) based on the frequency relevant to the thickness parameter (ft), wherein the thickness value (t) corresponds to thickness of each of the two or more layers in the wall at the one or more locations, and comparing the thickness value (t) of one location of the one or more locations with the corresponding thickness value (t) at other location of the one or more locations, to determine the crack propagation in the wall.

3. The method as claimed in claim 1, comprises, modulating, by the detection unit, the reflected stress signal with the reference signal for determining the one or more coefficients (Y) for each of the one or more dominant frequency parameters ($f_d$).

4. The method as claimed in claim 3, wherein the reference signal is selected such that a frequency of the reference signal matches with each of the one or more dominant frequency parameters ($f_d$).

5. The method as claimed in claim 1, comprises computing, by the detection unit, each of the one or more coefficients (Y) at a respective predefined phase value (Ø) of the one or more predefined phase values (Ø), by incrementing each of one or more predefined phase values (Ø) in the reference signal, wherein the one or more predefined phase values (Ø) ranges from about 0 degrees to about 360 degrees.

6. The method as claimed in claim 1, comprises, generating, by the detection unit, a coefficient plot based on the one or more coefficients (Y) and the one or more predefined phase values (Ø) for identifying the dominant phase ($Ø_d$) for each of the one or more dominant frequency parameters ($f_d$), wherein one or more peak values of the coefficient plot is detected for identifying the dominant phase ($Ø_d$).

7. The method as claimed in claim 1, wherein the reflected stress signal is in a time-domain parameter.

8. The method as claimed in claim 7, comprises converting, by the detection unit, the reflected stress signal in the time-domain parameter to a frequency domain parameter, for determining the one or more dominant frequency parameters ($f_d$) in the reflected stress signal.

9. A detection unit for detecting crack propagation in a wall of a metallurgical furnace having two or more layers, the detection unit comprising: a signal generating unit, for transmitting a stress signal to propagate in the wall at one or more locations on the wall of the metallurgical furnace; a processor; a memory, communicatively coupled to the processor, wherein the memory stores processor-executable instructions; and an I/O interface communicatively coupled to the processor; wherein the processor is configured to: receive, through at least one sensor unit, a reflected stress signal for each of the one or more locations based on the corresponding stress signal transmitted at each of the one or more locations; extract, one or more dominant frequency parameters (fa) from the corresponding reflected stress signal, for each of the one or more locations, each of the one or more dominant frequency parameters (fa) corresponding to a respective one of the two or more layers; analyze a phase, of each of the one or more dominant frequency parameters (fa) for a corresponding location from the one or more locations, wherein the analysis comprises: determining, by the processor of the detection unit, one or more coefficients (Y) for each of the one or more dominant frequency parameters (fa) based on the reflected stress signal and a reference signal, identifying, by the processor of the detection unit, a dominant phase (O) for each of the one or more dominant frequency parameters (fa) based on the corresponding one or more coefficients (Y), selecting, by the processor of the detection unit, a frequency relevant to a thickness parameter (ft) of a layer of the two or more layers from the one or more dominant frequency parameters (fa) for the corresponding location of the one or more locations on the wall, based on the dominant phase (O), and detecting, by the processor of the detection unit, the crack propagation in the wall of the metallurgical furnace based on analyzing the frequency relevant to the thickness parameter (ft) at each of the one or more locations; and responsive to detecting the crack propagation in the wall of the metallurgical furnace, provide, via the I/O interface, an alert indicating the crack propagation in the wall.

10. The detection unit as claimed in claim 9, wherein the processor of the detection unit is configured to determine the crack propagation in the wall, by: computing a thickness value (t) based on the frequency relevant to the thickness parameter (ft), wherein the thickness value (t) corresponds to thickness of each of the two or more layers in the wall at the one or more locations; and comparing the thickness value (t) of one location of the one or more locations with the corresponding thickness value (t) at other location of the one or more locations, to determine crack propagation in the wall.

11. The detection unit as claimed in claim 9, wherein the processor of the detection unit is configured to convert the reflected stress signal in a time-domain parameter to a frequency domain parameter, for determining the one or more dominant frequency parameters ($f_d$) in the reflected stress signal.

12. The detection unit as claimed in claim 9, wherein the processor of the detection unit is configured to modulate the reflected stress signal with the reference signal, and wherein the reference signal is selected such that a frequency of the reference signal matches with each of the one or more dominant frequency parameters ($f_d$).

* * * * *